Figure 4:
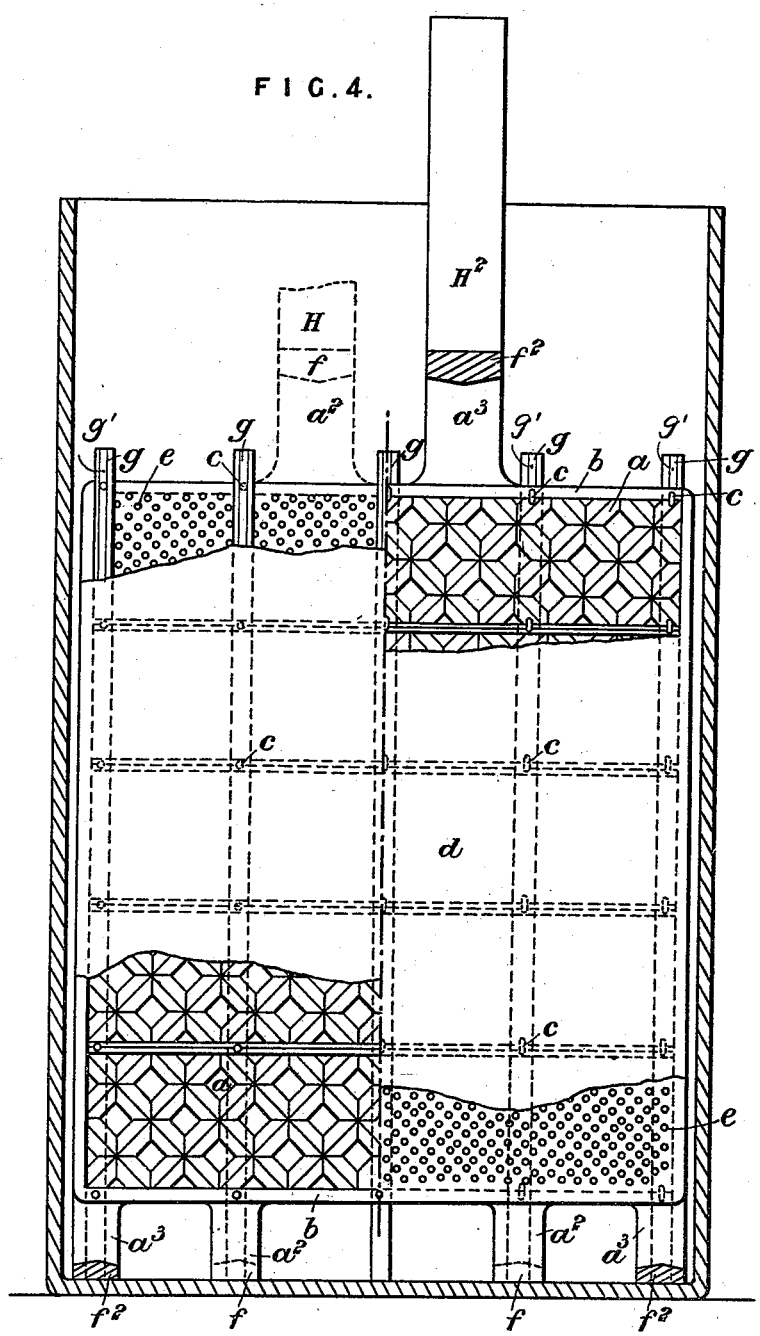

(No Model.)　　　　　　　　　　　　　　　　　　　　3 Sheets—Sheet 1.
F. KING.
SECONDARY BATTERY.
No. 544,673.　　　　　　　　　　　　Patented Aug. 20, 1895.
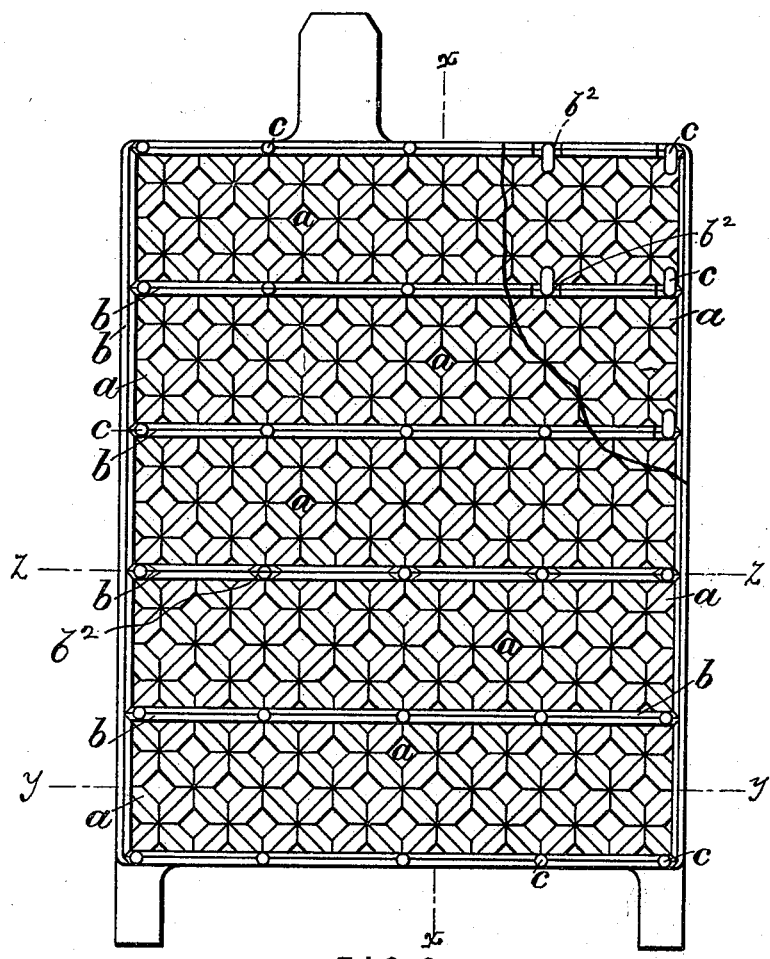
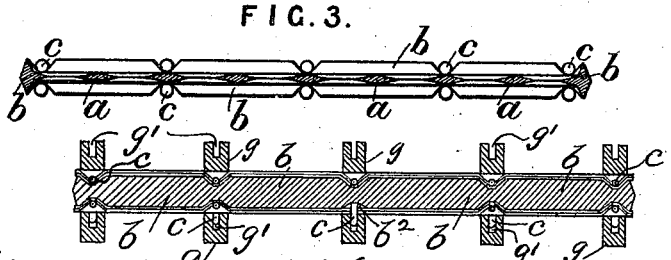

(No Model.) 3 Sheets—Sheet 2.

F. KING.
SECONDARY BATTERY.

No. 544,673. Patented Aug. 20, 1895.

Witnesses.
Reve Lewis
W. R. Edelen

Inventor.
Frank King,
by Edw. d Mauro
his attorney

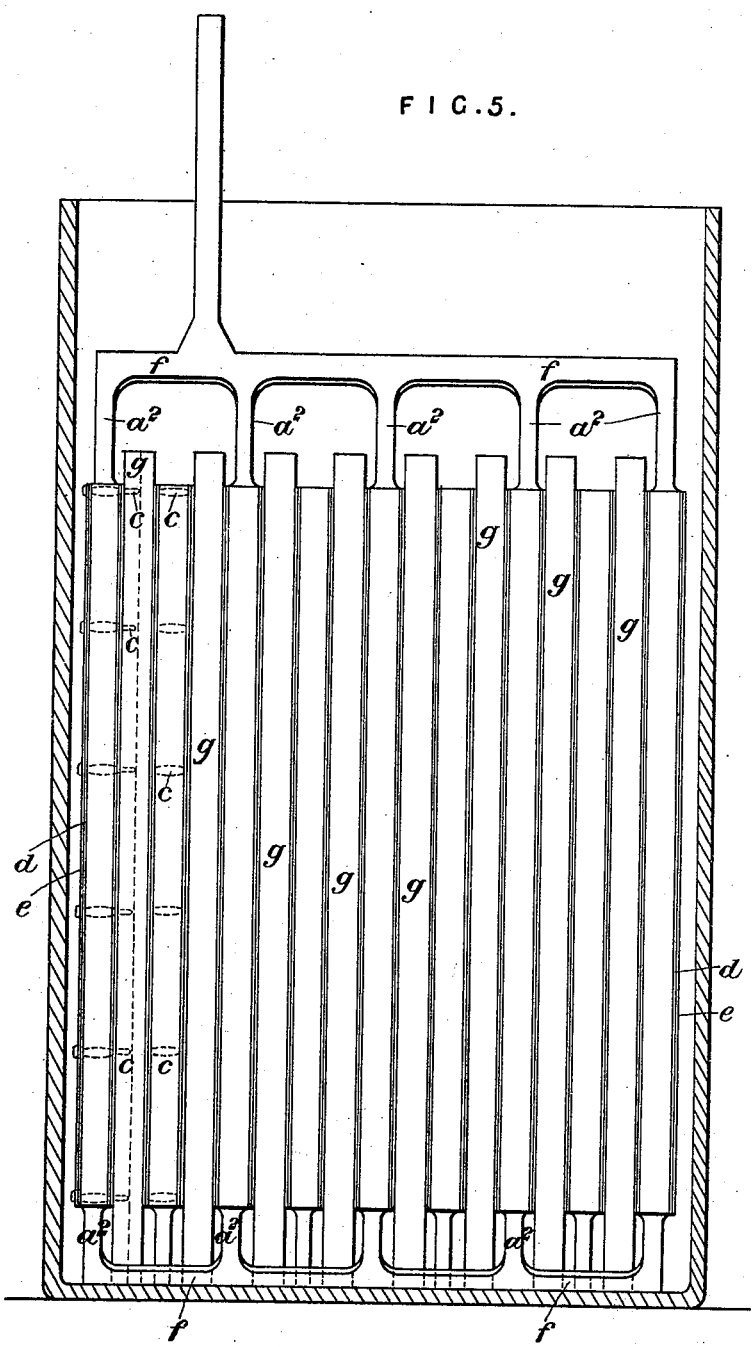

UNITED STATES PATENT OFFICE.

FRANK KING, OF LONDON, ENGLAND.

SECONDARY BATTERY.

SPECIFICATION forming part of Letters Patent No. 544,673, dated August 20, 1895.

Application filed April 5, 1895. Serial No. 544,554. (No model.)

*To all whom it may concern:*

Be it known that I, FRANK KING, engineer, a subject of the Queen of Great Britain and Ireland, residing at 4 Great Winchester Street, in the city of London, England, have invented certain Improvements in Secondary Batteries, of which the following is a specification.

My invention relates to improvements in secondary batteries wherein it is desired to effectively support a large quantity of active material and to maintain it in contact with the conducting plate or grid or the like. In those types or classes of secondary batteries wherein the active material forms a large proportion of the plate or electrode, as a whole, the practical difficulty to be overcome has hitherto been the maintenance of the said material in effective electrical contact with the conducting plate, grid, or the like, so as to render the energy contained in such material available for use, the repeated expansions and contractions which the said active material undergoes in working having usually the effect of breaking the continuity of the electrical and mechanical connection between the conducting plate, grid, or the like and the active material.

In a battery conducted according to my invention the conducting plate, grid, or the like may be of any suitable form, and upon or as part of the said plate, grid, or the like, I form a number of webs or ridges to constitute the boundary or boundaries of the surfaces of the finished plate or electrode holding the active material, or material to be rendered active. For example, the conducting plate, grid, or the like may be, say, one-sixteenth of an inch thick, and upon or as part of this I cast or form webs or ridges, which may conveniently be as much as a quarter of an inch from the outer edge to the surface of the conducting plate or electrode. Such an arrangement is provided on each of the two sides of the conducting plate, grid, or the like. The thickness of the conducting plate or electrode, as a whole, will then be, say, nine-sixteenths of an inch, and the effective amount of active material on or in the plate or electrode will be about seven-eighths of the whole bulk.

In the accompanying drawings, Figure 1 is a side view; Fig. 2, a vertical section on line $xx$, Fig. 1; Fig. 3, a transverse section on line $y y$, Fig. 1. Figs. 4 and 5 are sections at right angles to each other, illustrating a battery provided with grids such as herein described, and arranged generally according to my invention; and Fig. 6 is a transverse section on line $z z$, Fig. 1, including the insulating-strips, not shown in said figure.

Referring to the drawings, $a$ represents a conducting-grid having cast or formed with it the webs or ridges $b$, forming boundaries, as hereinbefore described. Pins $c$ are formed on or cast with the grid, there being cut-away parts or notches $b^2$ in the webs $b$ to allow the pins $c$ to be bent over, as hereinafter mentioned, and shown in Figs. 3 and 6 and in dotted lines in Fig. 2.

I maintain the active material against the conducting plate, grid, or the like $a$ by means of a perforated or a porous diaphragm or sheet, covering, or envelope of non-conducting material, (or two or more of them,) such as is not readily attacked by the electrolyte or by the gases evolved or by contact with the oxides forming part of the active material. In the accompanying drawings I have shown an asbestos sheet $d$ next the active material and a perforated celluloid sheet $e$ outside that.

To more effectively insure the permanence of contact between the active material and the conducting plate, grid, or the like I build up the plates or electrodes of opposite denomination each into a metallic frame by allowing convenient portions of the conducting plate, grid, or the like, as at $a^2$, to protrude from the perforated or porous retaining sheet, covering, or envelope or the like, and I burn or solder these protruding portions to a metal bar or bars $f$, thus fixing the proper distance apart of the plates or electrodes. In the drawings I have shown a bar above and below, as shown at $f$, with regard to the electrodes of one denomination, those of the other denomination being similarly connected by projections and bars, shown at $a^3 f^2$ in Fig. 4. Between the plates or electrodes, and preferably in a transverse direction to the longitudinal metallic projections $b$ on the conducting plates or grids $a$, I place strips $g$ of insulating material, which are wedged or forced into position with sufficient firmness to effectually support the perforated or porous diaphragms, such as d e, and thus assist in holding the active material in direct contact with the conducting plate or grid a. The said strips or pieces of insulating material are preferably held in position by means of the pins c, projecting from the webs or ridges b, as aforesaid, and for this purpose the strips g are channeled or grooved, as at g', so that the groove or channel accommodates the said projecting pins. Those of the pins which are not used to engage the grooves or channels in the strips g are bent over, so as to effectually secure the perforated and porous sheets, such as d and e, in position.

H $H^2$ are the lugs for the current to and from the battery.

Having now particularly described and ascertained the nature of my said invention and in what manner the same is to be performed, I declare that what I claim is—

In secondary batteries, the combination with plates, or electrodes of each denomination, having protruding portions of the conducting support burned or soldered to a bar, said electrodes each comprising active material, a grid for said material having pins thereon and a porous diaphragm, sheet, covering or envelope through which said pins project, of insulating strips wedged between the said plates or electrodes and held in position by engagement with the pins projecting through the diaphragm, sheet or covering, so as to fix the distance apart of the plates or electrodes, and maintain them in position, and the active material in position thereon, substantially as described.

In testimony whereof I have signed my name to this specification in the presence of two subscribing witnesses.

FRANK KING.

Witnesses:
H. D. HOSKINS,
J. MAYO SMITH.